United States Patent
Winkelmeyr

(10) Patent No.: US 11,646,625 B2
(45) Date of Patent: May 9, 2023

(54) ELECTRONIC VALVE FOR AN ELECTRIC MOTOR

(71) Applicant: AUDI AG, Ingolstadt (DE)

(72) Inventor: Felix Winkelmeyr, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 361 days.

(21) Appl. No.: 17/066,893

(22) Filed: Oct. 9, 2020

(65) Prior Publication Data
US 2021/0175768 A1 Jun. 10, 2021

(30) Foreign Application Priority Data
Dec. 10, 2019 (DE) .................... 10 2019 133 679.1

(51) Int. Cl.
*H02K 5/10* (2006.01)
*B60K 1/00* (2006.01)

(52) U.S. Cl.
CPC ............. *H02K 5/10* (2013.01); *B60K 1/00* (2013.01); *H02K 2205/09* (2013.01)

(58) Field of Classification Search
CPC .............................. H02K 5/10; H02K 2205/09
See application file for complete search history.

(56) References Cited

U.S. PATENT DOCUMENTS

| | | | | |
|---|---|---|---|---|
| 5,077,503 A | * | 12/1991 | Tamura | .................... H02K 5/10 310/88 |
| 8,080,909 B2 | * | 12/2011 | Perkins | .................... H02K 9/19 310/59 |
| 2010/0295391 A1 | | 11/2010 | Perkins | |

FOREIGN PATENT DOCUMENTS

| | | |
|---|---|---|
| CH | 155891 A | 7/1932 |
| CN | 204512542 U | 7/2015 |
| CN | 105762968 A | 7/2016 |
| DE | 542331 A | 1/1932 |
| DE | 25 16 783 A1 | 10/1976 |
| DE | 10 2009 027 095 A1 | 12/2010 |
| JP | 2004-162609 A | 6/2004 |
| KR | 101598040 B1 | 2/2016 |

OTHER PUBLICATIONS

Examination Report dated Jul. 27, 2020 in corresponding German application No. 10 2019 133 679.1; 14 pages including Machine-generated English-language translation.

* cited by examiner

*Primary Examiner* — Dang D Le
(74) *Attorney, Agent, or Firm* — Maier & Maier, PLLC

(57) ABSTRACT

A valve for an electric vehicle for draining condensation from an electric motor, wherein the valve is designed to be controllable electronically. Furthermore, the present disclosure relates to an electric motor including at least one valve as described above.

15 Claims, 1 Drawing Sheet

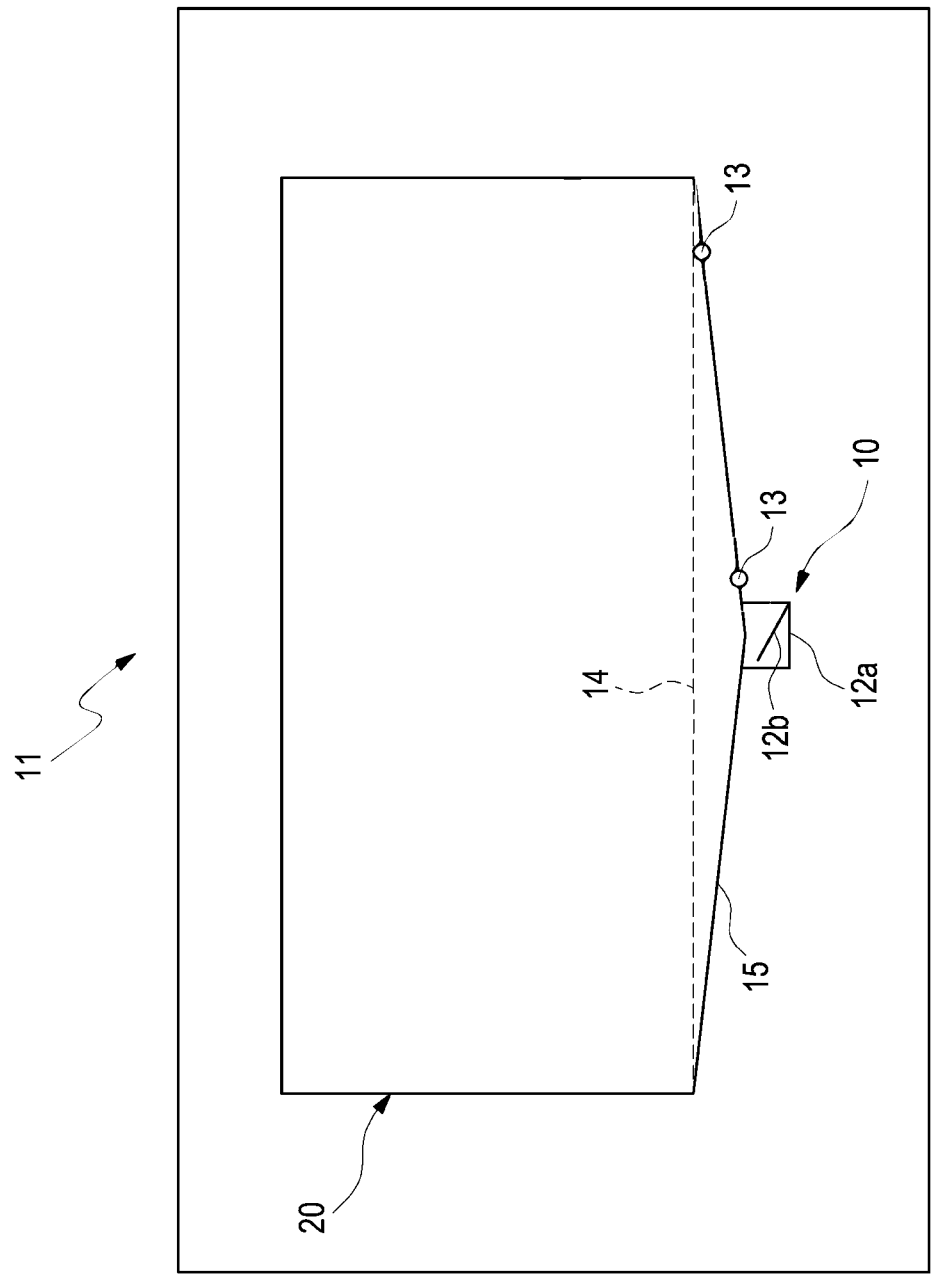

ELECTRONIC VALVE FOR AN ELECTRIC MOTOR

FIELD

The present disclosure relates to a valve for an electric vehicle for draining condensation from an electric motor.

BACKGROUND

Condensation in the electric motor can cause insulation faults in a stator of an electric motor, or cause short circuits, with the result that an electric vehicle can no longer be moved due to engine failure.

In the state of the art, it is known that condensation accumulates in the bottom portions of electric motors. In addition, valves for discharging condensation are known in the state of the art.

For example, an electric engine in which a rotor housing has a valve for draining condensation is known from KR 101 598 040 B1.

An electric engine which has a one-way valve for the removal of condensation is known from the publication CN 204 512 542 U.

A method for the removal of condensation in an electric engine is known from the publication CH 155 891 A. The condensation is discharged manually via a valve.

The problem underlying the present disclosure is to provide a device that allows for a more robust design of an electric motor.

SUMMARY

This problem is solved by a valve as well as by an electric motor. Advantageous refinements and designs are the subject of the description and of the description of the figures.

The subject matter of the present disclosure is a valve for an electric vehicle for draining condensation from an electric motor.

According to the disclosure, the valve is designed to be controlled electronically. Therein, the electronic valve is usually set up to be controllable based on a control logic. In particular, the control logic therein is set up and designed for use in a high-voltage system. The control logic optimized for high-voltage systems makes it possible to meet high leakage requirements.

Typically, the electronic valve is set up to be controllable automatically. This has the advantage that the electronic valve is controllable automatically based on at least one preset control logic.

Optionally, the electronic valve is set up to communicate with other sensors, in particular with at least one external sensor of the electric vehicle. Optionally, the control logic is set up to adjust the circuit or control of the electronic valve based on communicated or transmitted data from the at least one external sensor.

For example, the electronic valve is set up to remain closed in the event of precipitation detected by an external sensor of the vehicle. This has the advantage that no contaminated water can enter the electric motor from the outside. Optionally, the electronic valve is also set up to remain closed while the vehicle is traveling.

Optionally, the electronic valve is also set up to be controllable manually. This has the advantage that a vehicle user can access the electronic valve at any time.

The electronic valve according to the disclosure is thus set up to discharge the condensation damaging the electric motor without allowing contamination or water to penetrate into the electric motor.

In this design, the electronic valve is set up to be adjustable from a first position to at least one second position, wherein the electronic valve is set up to seal the electric motor in the first position and to discharge condensation from the electric motor in the second position. This has the advantage that the electronic valve seals the electric motor in the first position, whereby the electric motor is protected from external influences and in the second position allows for the condensation to be discharged from the electric motor. The electronic valve according to the disclosure allows for the formation of a more robust electric motor due to the targeted discharging of condensation, as the electric motor is protected from engine failure due to condensation.

In this design, the electronic valve is formed at the bottom of the electric motor. This has the advantage that the electronic valve is located in a position in the electric motor where the largest quantity of condensation accumulates. Thus, as large a quantity of condensation as possible can be released from the electric motor when opening the electronic valve or when switching the electronic valve to the second position.

In a refinement, the electronic valve is set up to automatically switch to the second position each time the motor starts up, and to discharge condensation automatically. This has the advantage that it is possible to ensure that the electric motor is free of condensation before or during each time the electric vehicle begins to travel. This prevents engine failure during the driving operation of the electric motor, as the condensation is usually automatically discharged when starting or before starting the electric motor.

In a further refinement, the electronic valve is set up to be switchable in intervals, whereby the intervals are preset or manually adjustable. This has the advantage that the condensation can be evacuated from the electric motor via the electronic valve at preset intervals.

In an alternative design, the electronic valve is set up to be switchable or to open at intervals while traveling, if an external sensor does not detect precipitation. This prevents excessive accumulation of condensation in the electric motor during long travel, which also prevents engine failure due to accumulation of condensation when traveling long distances.

In a refinement, the electronic valve is controllable based on a quantity of water detected by at least one sensor arranged in the electric motor, in particular a quantity of condensation. Usually, the at least one sensor is formed on the bottom or at a lowest point of the electric motor. This has the advantage that the electronic valve can be switched to the second position at least only if the at least one sensor has detected a quantity of water.

The electronic valve is usually set up to be switchable only at a preset quantity of water. Therein, a preset quantity of water is a quantity of water at which no active parts of the electric motor, such as a stator or a rotor, come into contact with the quantity of water.

In an alternative design, the electronic valve can be controlled based on a quantity of water detected by at least two sensors. In an optional embodiment, the electronic valve is set up to issue a warning in the case of a quantity of water detected by a first sensor and to open automatically in the case of a quantity of water detected by a second sensor. This has the advantage that the electronic valve is set up in such a way that it can issue a notification regarding a detected level of condensation or quantity of condensation to a vehicle user. For example, the electronic valve can be set up to transmit a notification regarding the detected quantity of condensation to a human-machine interface (HMI).

The subject matter of the present disclosure furthermore is an electric motor for an electric vehicle. The electric vehicle usually comprises other sensors, in particular at least one external sensor for detecting precipitation and/or temperature. Optionally, the electric vehicle comprises at least one human-machine interface (HMI).

According to the disclosure, the electric motor comprises at least one electronic valve as described above. The electronic valve allows for the electric motor to be designed in a more robust manner, as condensation which has accumulated at the bottom of the electric motor can be actively discharged by means of the electronic valve.

Usually, the electronic valve is set up to communicate with at least one of the other sensors of the electric vehicle. For example, the electronic valve is set up to obtain data or values from an external sensor of the electric vehicle. For example, an external sensor can be a temperature sensor or a precipitation sensor. Alternatively, the electronic valve may be set up to obtain weather data from the HMI of the electric vehicle and to include it in the control logic.

The electronic valve comprises a control logic and is usually set up to be switchable, based on the control logic, from a first position in which the electric motor remains closed or sealed to a second position in which the valve opens and condensation can be discharged. Thus, the electronic valve is set up to open and close the electric motor.

The electric motor according to the disclosure is set up to allow for a targeted draining of condensation, thereby increasing the robustness of the electric motor, as the risk of engine failure due to the presence of condensation is greatly reduced.

In one embodiment, the electronic valve is set up to be automatically switchable during a start-up process or before starting the electric motor, wherein the electronic valve is set up to open automatically during the start-up process of the electric motor. This has the advantage that the electric motor is cleared of condensation before beginning to travel, such that an engine failure of the electric motor due to the presence of condensation is prevented.

In an optional refinement, the electronic valve is furthermore set up to be switchable in intervals, wherein the intervals are preset or manually adjustable. Especially for longer traveling distances, it is advantageous to actively discharge condensation accumulated at the bottom of the electric motor. This prevents excessive accumulation of condensation in the electric motor, which also prevents engine failure due to accumulation of condensation when traveling long distances.

In a refinement, the electric motor comprises at least one sensor, which is set up for detecting a quantity of water, in particular a quantity of condensation. Usually, the at least one sensor is formed on the bottom or at the lowest point of the electric motor. The arrangement of the electronic valve at the lowest point of the electric motor has the advantage that as much condensation as possible can be discharged automatically from the electric motor without pumps.

The at least one sensor arranged in the electric motor is usually set up for detecting a water level of the condensation or a quantity of the condensation. This has the advantage that it is possible to determine exactly how much condensation is present in the electric motor. When the sensor detects a quantity of water, the condensation can be discharged via the electronic valve. This has the advantage that condensation can be discharged exactly when condensation is present. Thereby, the electric motor furthermore is opened only when it is necessary for discharging.

In a refinement, the electronic valve is controllable based on the quantity of condensation detected by the at least one sensor. Therein, the electronic valve is set up to open when a level of condensation has been detected by the at least one sensor and to discharge condensation from the electric motor. Therein, the quantity of condensation, at which the electronic valve can be switched, is adjustable.

In an alternative design, the electronic valve can be controlled based on a quantity of water detected by at least two sensors. Therein, a first sensor is usually set up for detecting a first quantity of condensation, and a second sensor is set up to detect a second quantity of condensation. In an optional embodiment, the electronic valve can be set up to issue a warning in the case of a quantity of condensation detected by the first sensor and to open automatically in the case of a quantity of condensation detected by the second sensor. This has the advantage that the electronic valve is set up in such a way that it can issue a notification regarding a detected condensation level or a quantity of condensation to the vehicle user.

Typically, the electronic valve is set up to transmit a notification regarding the detected quantity of condensation to a human-machine interface (HMI) of the electric vehicle. Optionally, the quantity of condensation can be displayed graphically for a vehicle user.

In this design, the electric motor is set up and formed to discharge detected condensation automatically. This has the advantage that condensation is automatically removed by the electric motor independently of the vehicle user. Thus, a vehicle user does not have to pay attention to a quantity of condensation in the electric motor.

BRIEF DESCRIPTION OF THE DRAWINGS

The disclosure is shown schematically in the drawings on the basis of embodiments, and is described further with reference to the drawing, wherein identical components are labeled with identical reference numbers. Shown in:

FIG. 1 A graphical representation of an electric vehicle with an embodiment of an electric motor according to the disclosure comprising a valve according to the disclosure.

DETAILED DESCRIPTION

FIG. 1 shows a graphical representation of an electric vehicle 11 with an embodiment of an electric motor 20 according to the disclosure comprising a valve 10 according to the disclosure Therein, the valve 10 is formed or arranged at a lowest point of the electric motor 20 or in a bottom 15 of the electric motor 20. Thus, the valve 10 is arranged at the place where the largest quantity of condensation 14 accumulates in the electric motor 20. Arranging the valve 10 in the bottom of the electric motor 20 thus allows for discharging as large a quantity of condensation 14 as possible when opening the valve 10.

The valve 10 is formed in an electronic design and set up to be controllable. Therein, the electronic valve 10 in the present embodiment is set up by a control logic to be able to be shifted or adjusted from a first position 12a to a second position 12b. In the first position 12a, the electronic valve 10 is set up to seal the electric motor 20. In the second position 12b, the electronic valve 10 is set up to open, and to discharge condensation 14 from the electric motor 20.

Thus, the electric motor 20 is protected from external influences by means of the electronic valve 10 in its first position 12a, and the electronic valve 10 in its second position 12b allows for the condensation 14 to be discharged from the electric motor 20.

Usually, the electronic valve 10 is controllable automatically. Therein, the electronic valve 10 is controlled based on a preset control logic. Even with an automatic control of the electronic valve 10, manual operation by a vehicle user is typically possible.

In a present embodiment, the electronic valve 10 is controllable depending on a quantity of condensation 14 detected by a sensor 13. As a rule, the at least one sensor 13 in the area of the electric motor 20 is formed in the bottom 15 of the electric motor 20. In the present embodiment, two possible positions for the one sensor 13 are shown. The electronic valve 10 therein switches to the second position 12b only if the at least one sensor 13 has detected a quantity of condensation 14, which quantity typically is preset. Thus, the electronic valve 10 of the electric motor 20 is set up to be switchable only at a detected preset quantity of condensation 14.

In alternative embodiments, the electronic valve 10 may comprise further positions for setting a quantity of condensation 14 to be discharged, in order to control the quantity to be discharged or the flow rate of the same.

In a further embodiment, the electronic valve 10 usually switches automatically to the second position 12b each time the electric motor 20 is started. This automatically opens the electronic valve 10 each time the electric motor 20 starts, and automatically discharges condensation 14.

In addition to the embodiment in which the electronic valve 10 is set up to switch to the second position 12b each time the motor starts, the electronic valve 10 can also be set up in an alternative design to be additionally switchable at intervals in order to be able to remove condensation 14 continuously during travel.

The invention claimed is:

1. A valve comprising:
the valve for an electric vehicle for draining condensation from an electric motor wherein the valve is designed to be controllable electronically, and wherein the electronic valve is set up to be switchable at intervals, where the intervals are preset or manually adjustable.

2. The valve according to claim 1, wherein the electronic valve is set up to be adjustable from a first position to at least one second position, wherein the electronic valve is set up to seal the electric motor in the first position and to discharge condensation from the electric motor in the second position.

3. The valve according to claim 2, wherein the electronic valve is set up to automatically switch to the second position each time the electric motor starts, and to discharge condensation automatically.

4. The valve according to claim 3, wherein the electronic valve is controllable based on a quantity of water, in particular condensation, detected by at least one sensor arranged in the electric motor.

5. The valve according to claim 2, wherein the electronic valve is formed on the bottom of the electric motor.

6. The valve according to claim 2, wherein the electronic valve is controllable based on a quantity of water, in particular condensation, detected by at least one sensor arranged in the electric motor.

7. The valve according to claim 1, wherein the electronic valve is formed on the bottom of the electric motor.

8. The valve according to claim 7, wherein the electronic valve is set up to automatically switch to the second position each time the electric motor starts, and to discharge condensation automatically.

9. The valve according to claim 7, wherein the electronic valve is controllable based on a quantity of water, in particular condensation, detected by at least one sensor arranged in the electric motor.

10. The valve according to claim 1, wherein the electronic valve is controllable based on a quantity of water, in particular condensation, detected by at least one sensor arranged in the electric motor.

11. An electric motor for an electric vehicle comprising:
at least one electronic valve for draining condensation from an electric motor wherein the electronic valve is designed to be controllable electronically, wherein the electronic valve is set up to be switchable at intervals, where the intervals are preset or manually adjustable.

12. The electric motor according to claim 11, wherein the electric motor comprises at least one sensor which is set up for detecting a quantity of water, in particular a quantity of condensation.

13. The electric motor according to claim 12, the electronic valve is controllable based on a level of condensation detected by the at least one sensor.

14. The electric motor according to claim 13, wherein the electric motor is set up and designed for discharging detected condensation automatically.

15. The electric motor according to claim 12, wherein the electric motor is set up and designed for discharging detected condensation automatically.

* * * * *